Patented Oct. 27, 1936

2,058,568

UNITED STATES PATENT OFFICE 2,058,568

PROCESS OF BREAKING PETROLEUM EMULSIONS

Ivor Milton Colbeth, Belleville, N. J., assignor to The Baker Castor Oil Company, New York, N. Y., a corporation of Delaware No Drawing. Application October 8, 1931, Serial No. 567,753

1 Claim. (Cl. 196—4)

This invention relates to a process for controlling the relative surface tensions and interfacial adsorption between immiscible liquids to the end that emulsions of the liquids can be demulsified when desired.

By the present invention relative surface tensions or emulsification tendencies of immiscible liquids are changed by the addition of such substances that the surface tensions or emulsification tendencies of liquids capable of forming emulsions are brought sufficiently near each other to enable the emulsions to be broken when desired. The term "liquid" is intended to include solutions of solids in liquids. The term "emulsification tendency" is intended to include the various surface tensions and adsorption phenomena occurring at the interface.

In carrying out this invention substances can be used for changing the surface tensions or emulsification tendencies of liquids, which substances are either so-called mixed compounds known as aldehyde-acids, or are substances from which aldehyde-acids can be obtained by chemical reaction such as oxidation and/or polymerization, or are substances obtained by treating these aldehyde-acids with other compounds, or are mixtures of such substances. The aldehyde-acid compounds are at the same time aldehydes and acids. The substances obtained from the aldehyde-acids for breaking the emulsions may be obtained from the aldehyde-acids by treating them with ammonia, or ammonia derivatives, such as aliphatic and aromatic amides and amines, or sodium bisulphite, or hydrocyanic acid, etc., which will react with aldehydes or the carbonyl group of the molecules, thus yielding amino compounds and addition products of the reagents added, or by treating them with phosphorus chlorides, ozone, alcohols or alkalis other than ammonia and ammonia derivatives, etc., which will react with the acid or carboxyl group, thus yielding acylchlorides, or acid-peroxides, or esters, for example. These mixed compounds may also be treated with halogens, whereupon the aldehydes form halogen derivatives. The solubilities of these substances vary greatly, so that some of them are water soluble and others are water insoluble and various ones of them differ as to their solubilities in different immiscible liquids which form emulsions, such as oils and water, thus making it possible to vary the surface tension of constituents of emulsions and control the adsorption at the interface thereby breaking the emulsions. By selecting the substances to be added to the immiscible liquids the surface tension and emulsifying tendencies thereof can be so nearly equalized that emulsions of them can be broken down into the separate liquids comprising the emulsion with very little loss of liquid.

A convenient way to prepare the substances that are to be utilized in regulating the surface tensions or emulsification tendencies of immiscible liquids is to oxidize carefully fatty substances such as semi-drying or drying or non-drying oils of animal or vegetable origin preferably at a temperature of about 150° F. to about 350° F. with air or ozone or ozonized air so that the aldehyde and peroxide content of the resulting oxidized oil will be as high as it is feasible to make it. The oxidized products contain aldehyde-acids as well as polymerized fatty acids and polymerized oxidation products of fatty acids. These oxidized products may be treated with one or more of the compounds mentioned above which will react with them. Examples of oils that may be oxidized for this purpose are castor oil, rapeseed oil, corn oil, cotton-seed oil, linseed oil, soya bean oil, China-wood oil and fish oil, etc. Fatty acid esters of lower or higher alcohols than glycerol, such as methyl, ethyl, propyl, butyl, or glycol esters, or mannitol or sorbitol esters, etc. may be used instead of oils from which to obtain the substances for controlling the surface tensions or emulsification tendencies of immiscible liquids, enabling emulsions to be broken, as desired.

When it is desired to break an emulsion, that substance is selected which will dissolve in the continuous phase and is used in an amount sufficient to equalize or substantially equalize the emulsifying tendencies of the two liquids, or that substance is added which will adsorb the colloid present without itself being soluble in the continuous phase.

A simple test is usually sufficient in each instance to determine what substance is to be used for de-emulsifying, as soon as it is known what liquids are present in emulsions already formed.

The following is given as a specific example illustrative of the invention. It is also to be understood that the proportions given can be widely varied and that the temperatures mentioned are those which have thus far been found to be the most suitable, but that they can be changed.

An emulsion of crude mineral oil and brine in about equal proportions is treated with a mixture of about one percent of castor oil oxidized as described above in connection with the oxidation of fatty substances colloidally dispersed in water using ammonia as the dispersing medium and the emulsion is allowed to stand after being agitated and heated to about 100° F. to 150° F. whereupon the emulsion separates into three layers after standing a short time. The top layer contains oil practically free from water; the middle layer, which is quite thin compared to the other layers, contains mineral oil, water and the added substance; and the bottom layer contains water with a very small amount of oil in it, usually less than 1% of oil. The amount of the 1% mixture to be added depends upon the type of crude mineral oil emulsion. 10% of this mixture has been found to give excellent results when intimately mixed with the emulsion and heated to about 100 to 150° F.

When the protective colloid can be adsorbed by the oxidized oil the oxidized oil itself may be used without further treatment for breaking emulsions. Where the term "aldehyde-carboxylic-acid residue" is used in the claim, it is intended to include the acid itself.

I claim:

A process for breaking petroleum emulsions which comprises treating said emulsions with an unsaponified de-emulsifying agent containing an aldehyde-carboxylic-acid residue.

IVOR MILTON COLBETH.